US009084508B2

(12) United States Patent  
Sandford et al.

(10) Patent No.: US 9,084,508 B2
(45) Date of Patent: Jul. 21, 2015

(54) KITCHEN APPLIANCE FOR PROCESSING FOODSTUFF AND METHOD OF OPERATING SAME

(71) Applicant: Hamilton Beach Brands, Inc., Glen Allen, VA (US)

(72) Inventors: Michael G Sandford, Mechannicsville, VA (US); Ernest B Pryor, Jr., Maidens, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 156 days.

(21) Appl. No.: 13/774,043

(22) Filed: Feb. 22, 2013

(65) Prior Publication Data

US 2013/0233950 A1    Sep. 12, 2013

Related U.S. Application Data

(60) Provisional application No. 61/608,193, filed on Mar. 8, 2012.

(51) Int. Cl.
| | |
|---|---|
| *A47J 43/046* | (2006.01) |
| *A47J 36/10* | (2006.01) |
| *A47J 43/07* | (2006.01) |
| *A47J 43/08* | (2006.01) |

(52) U.S. Cl.
CPC ............... *A47J 36/10* (2013.01); *A47J 43/046* (2013.01); *A47J 43/0722* (2013.01); *A47J 43/0772* (2013.01); *A47J 43/085* (2013.01)

(58) Field of Classification Search
CPC .............. A47J 43/0772; A47J 43/0722; A47J 43/0777; A47J 43/046
USPC ....................... 241/282.1, 282.2, 37.5, 36, 92
See application file for complete search history.

(56) References Cited

U.S. PATENT DOCUMENTS

| | | | | |
|---|---|---|---|---|
| 4,226,373 | A | * | 10/1980 | Williams ...................... 241/37.5 |
| 4,396,159 | A | * | 8/1983 | Podell .......................... 241/37.5 |
| 4,506,836 | A | | 3/1985 | Williams |
| 4,629,131 | A | * | 12/1986 | Podell ............................. 241/36 |
| D290,677 | S | | 7/1987 | Strutzer et al. |
| 4,706,896 | A | | 11/1987 | Moon-Kau |
| 4,741,482 | A | | 5/1988 | Coggiola et al. |
| D311,659 | S | | 10/1990 | Storsberg |
| 5,454,299 | A | | 10/1995 | Gonneaud |
| 5,486,665 | A | | 1/1996 | LeRouzic |
| D394,183 | S | | 5/1998 | Arita et al. |
| D395,573 | S | | 6/1998 | Leverrier |
| 5,875,706 | A | * | 3/1999 | Borger et al. ................... 99/492 |
| D426,423 | S | | 6/2000 | Lee |

(Continued)

FOREIGN PATENT DOCUMENTS

WO    WO2005011454    10/2005

*Primary Examiner* — Faye Francis

(74) *Attorney, Agent, or Firm* — Alexander D. Raring

(57) ABSTRACT

A kitchen appliance includes a housing enclosing a motor and a switch mechanism. A bowl is removably mountable onto the housing. At least one actuation member is movable between a first position and a second position. A bowl lid is removably mountable onto the upper rim of the bowl. When the bowl lid is properly positioned onto the upper rim of the bowl, the motor is actuated or permitted to be actuated by pressing downwardly on the lid such that at least a portion of one of a plurality of flanges of the bowl contacts at least a portion of the actuation member to force the actuation member to the second position.

4 Claims, 5 Drawing Sheets

(56) References Cited

U.S. PATENT DOCUMENTS

| | | |
|---|---|---|
| D445,636 S | 7/2001 | Spagnolo |
| 6,474,578 B1 | 11/2002 | Gonneaud et al. |
| 6,510,784 B1 | 1/2003 | Fevre et al. |
| 6,513,966 B1 | 2/2003 | Gort-Barten et al. |
| 6,568,843 B1 | 5/2003 | Loi |
| 6,669,124 B2 | 12/2003 | Lazzer et al. |
| 6,907,819 B2 | 6/2005 | Kernan |
| D644,478 S | 9/2011 | Czach |
| 8,157,435 B2* | 4/2012 | Pryor, Jr. .................. 366/205 |
| 2001/0036124 A1* | 11/2001 | Rubenstein ................ 366/205 |
| 2003/0205635 A1* | 11/2003 | Lazzer et al. .............. 241/37.5 |
| 2004/0042337 A1* | 3/2004 | Yiu et al. .................... 366/199 |
| 2004/0042338 A1* | 3/2004 | Wu ............................. 366/205 |
| 2005/0000370 A1* | 1/2005 | Kernan ........................ 99/492 |
| 2008/0135654 A1* | 6/2008 | Pryor et al. ................ 241/37.5 |
| 2010/0206701 A1* | 8/2010 | Ferraby et al. ............. 200/50.1 |
| 2012/0206995 A1* | 8/2012 | Wu ............................. 366/205 |
| 2014/0001296 A1* | 1/2014 | Gen et al. ................... 241/100 |
| 2014/0021278 A1* | 1/2014 | Armstrong et al. ........ 241/37.5 |

* cited by examiner

KITCHEN APPLIANCE FOR PROCESSING FOODSTUFF AND METHOD OF OPERATING SAME

BACKGROUND OF THE DISCLOSURE

The present disclosure relates generally to a kitchen appliance for processing foodstuff and, more particularly, to a food processor or chopper that is relatively simple and easy to assemble and operate.

A food chopper typically includes a container that screws onto a motor base and a lid that screws or twists onto the container. One or more buttons in the motor base allow a user to actuate the electric motor. Users can be deterred from using the chopper as it requires a twist assembly for use. It can be difficult to obtain the proper alignment between the various parts in order to assemble. The parts may be tight and make disassembly for cleaning problematic. Basically, the structure or features that allow such components to be attached and/or function as a single unit can be difficult and/or awkward to utilize.

Therefore, there is a need for a food chopper or processor that is relatively simple and easy to assembly and operate. The device of the present disclosure accomplishes at least the above objectives and overcomes the above-described or other disadvantages of conventional kitchen appliances.

BRIEF SUMMARY OF THE DISCLOSURE

Briefly stated, one aspect of the present disclosure is directed to a kitchen appliance for processing foodstuff including a housing enclosing a motor and a switch mechanism to actuate or permit actuation of the motor. A bowl is removably mountable onto the housing. The bowl includes an upper rim defining a mouth for receiving a rotatable tool within the bowl. At least one actuation member is movable between a first position and a second position. In the first position, the actuation member is spaced-apart from the switch mechanism to maintain the switch mechanism in an open position and prevent actuation of the motor. In the second position, the actuation member engages the switch mechanism to actuate or permit actuation of the motor. A bowl lid is removably mountable onto the upper rim of the bowl. The bowl lid includes a top wall and a plurality of flanges depending downwardly therefrom. When the bowl lid is properly positioned onto the upper rim of the bowl, the motor is actuated or permitted to be actuated by pressing downwardly on the bowl lid such that at least a portion of one of the plurality of flanges contacts at least a portion of the actuation member to force the actuation member to the second position.

In another aspect, the present disclosure is directed to a kitchen appliance for processing foodstuff including a housing enclosing a motor and a switch mechanism to actuate or permit actuation of the motor. The housing includes an extension extending upwardly beyond an upper end of the housing. A bowl is removably mountable onto the housing. The bowl includes an upper rim that defines a mouth for receiving a rotatable tool within the bowl. At least one actuation member is positioned at least partially within the extension of the housing and is movable between a first position and a second position. In the first position, the actuation member is spaced-apart from the switch mechanism to maintain the switch mechanism in an open position and prevent actuation of the motor. In the second position, the actuation member engages the switch mechanism to actuate or permit actuation of the motor. A bowl lid is removably mountable onto the upper rim of the bowl. The bowl lid includes a top wall, a first flange depending downwardly from the top wall, a second flange depending downwardly from the top wall, and a third flange depending downwardly from the top wall. The third flange generally surrounds the second flange, and the second flange generally surrounds the first flange. When the bowl lid is properly positioned onto the upper rim of the bowl, at least a portion of the third flange contacts at least a portion of the actuation member to force the actuation member to the second position.

In yet another aspect, the present disclosure is directed to a method of operating a kitchen appliance including mounting a bowl onto a housing that encloses a motor and a switch mechanism to permit actuation of the motor. The method includes inserting foodstuff into a mouth of the bowl and mounting a lid onto an upper rim of the bowl that defines the mouth of the bowl, and supplying power to the motor. The method also includes pressing downwardly on at least a portion of the lid such that at least a portion of a flange depending downwardly from a top wall of the lid contacts at least a portion of an actuation member to engage the switch mechanism to actuate the motor.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there is shown in the drawings an embodiment which is presently preferred. It should be understood, however, that the disclosure is not limited to the precise arrangements and instrumentalities shown. In the drawings.

DETAILED DESCRIPTION OF THE DISCLOSURE

Figure 1:
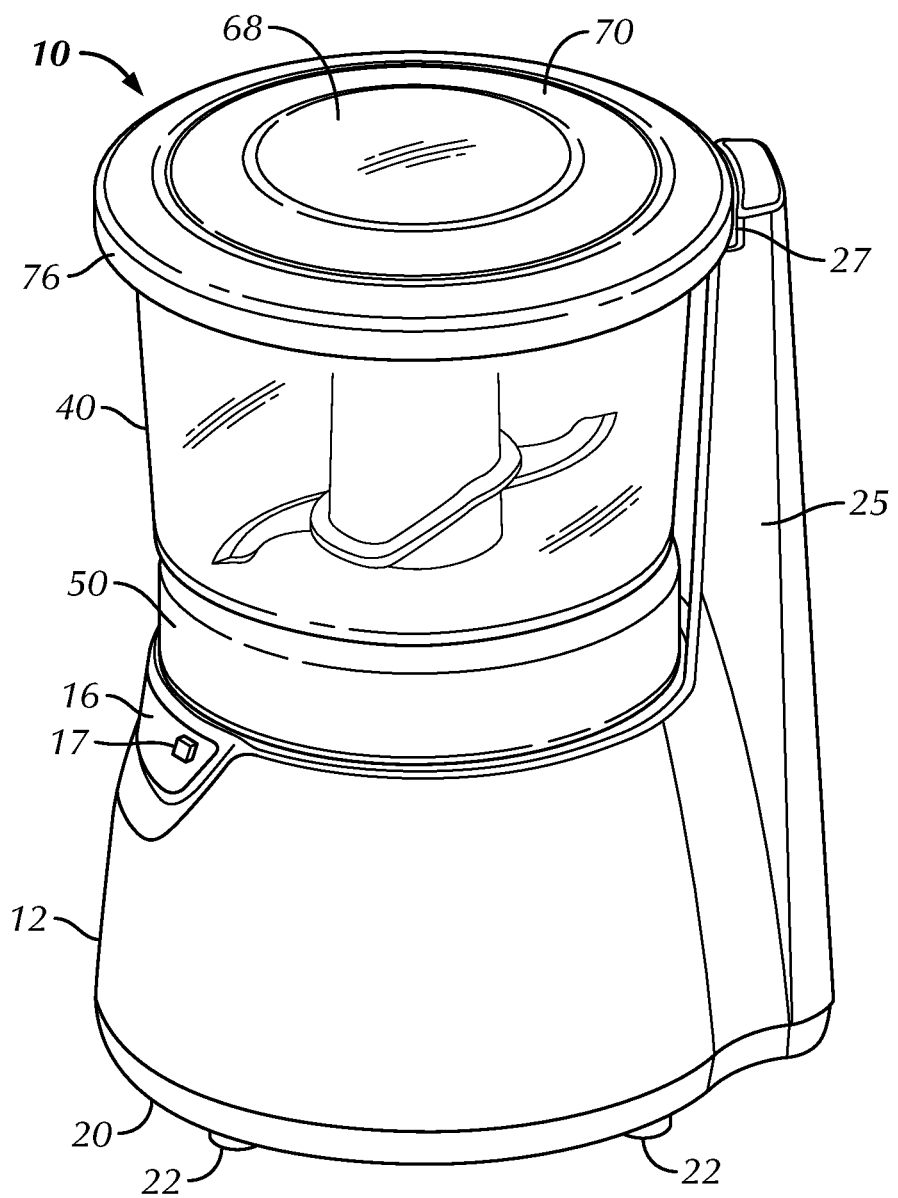
FIG. 1 is a perspective view of a kitchen appliance according to a preferred embodiment of the present disclosure, wherein the kitchen appliance is shown in a fully assembled configuration.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 2:
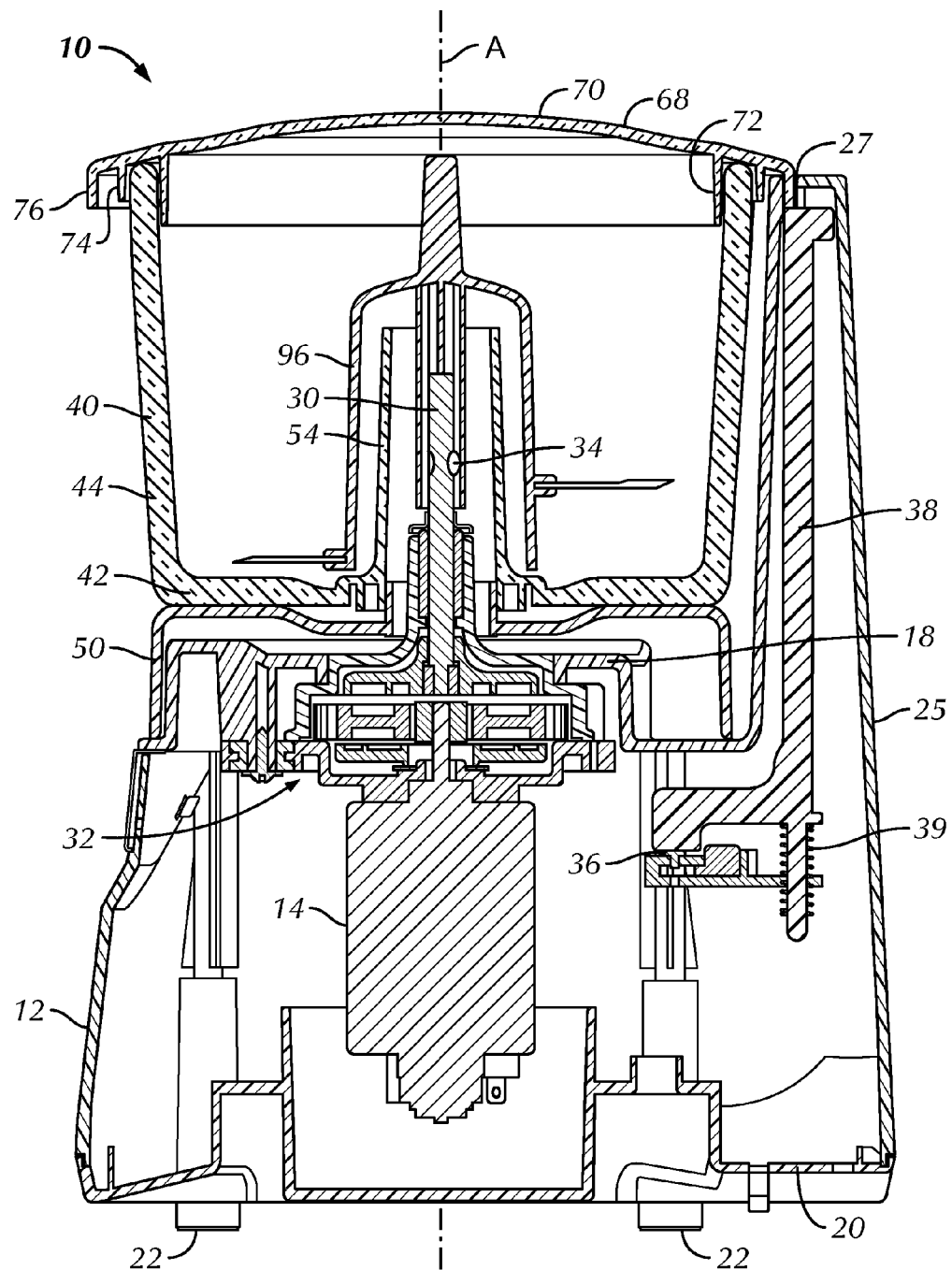
FIG. 2 is a cross-sectional side elevational view of the kitchen appliance, wherein a safety interlock feature is shown in a closed, engaged, or activated position.
Figure 3:
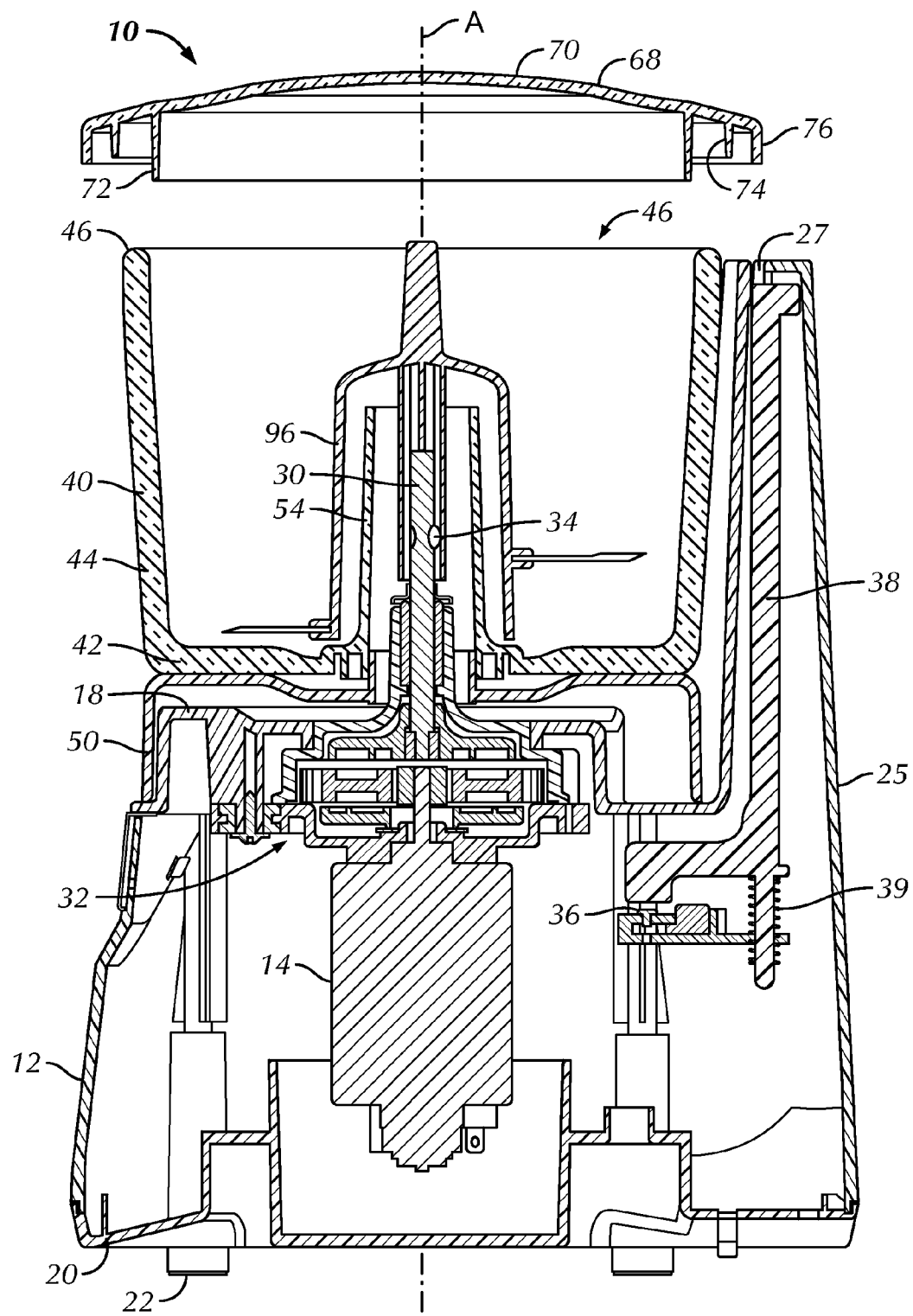
FIG. 3 is a cross-sectional side elevational view of the kitchen appliance, wherein the safety interlock feature is shown in an open, disengaged, or deactivated position.

Referring to the drawings in detail, wherein like numerals indicate like elements throughout, FIGS. 1-5 illustrate a kitchen appliance 10 in accordance with a preferred embodiment of the present disclosure. The kitchen appliance 10 is intended or designed for processing, chopping, blending or otherwise mixing foodstuff (not shown), such as meat(s), vegetables, soup, beverages, sauces and the like, or any combination thereof. The kitchen appliance 10 is preferably in the form of a food processor or chopper, but the kitchen appliance 10 may be any device, such as a blender, a combination coffee maker/grinder of the like, that includes at least two separable components. As shown in FIGS. 2 and 3, the kitchen appliance 10 defines a longitudinal axis A that extends at least generally, and preferably exactly, perpendicularly to a support surface (not shown), such as a tabletop or countertop, when the kitchen appliance 10 is placed on the support surface.

Referring to FIGS. 1-4, the kitchen appliance 10 includes a housing 12 that at least partially encloses a motor 14 and a switch mechanism 36 (see FIGS. 2 and 3). The motor 14 is preferably a one speed universal motor, but the present disclosure is not so limited, as the motor 14 may have multiple, distinct speeds that are selected by a user. Power may be supplied to the motor 14 from a conventional wall outlet (not shown) through a power cord (not shown). The switch mechanism 36 is preferably positioned proximate to the motor 14, and the switch mechanism 36 is preferably operably connected to the motor 14 to actuate or permit actuation of the motor 14. The switch mechanism 36 preferably includes a first, open or disengaged position (FIG. 3) and a second, closed or engaged position (FIG. 2).

Figure 4:
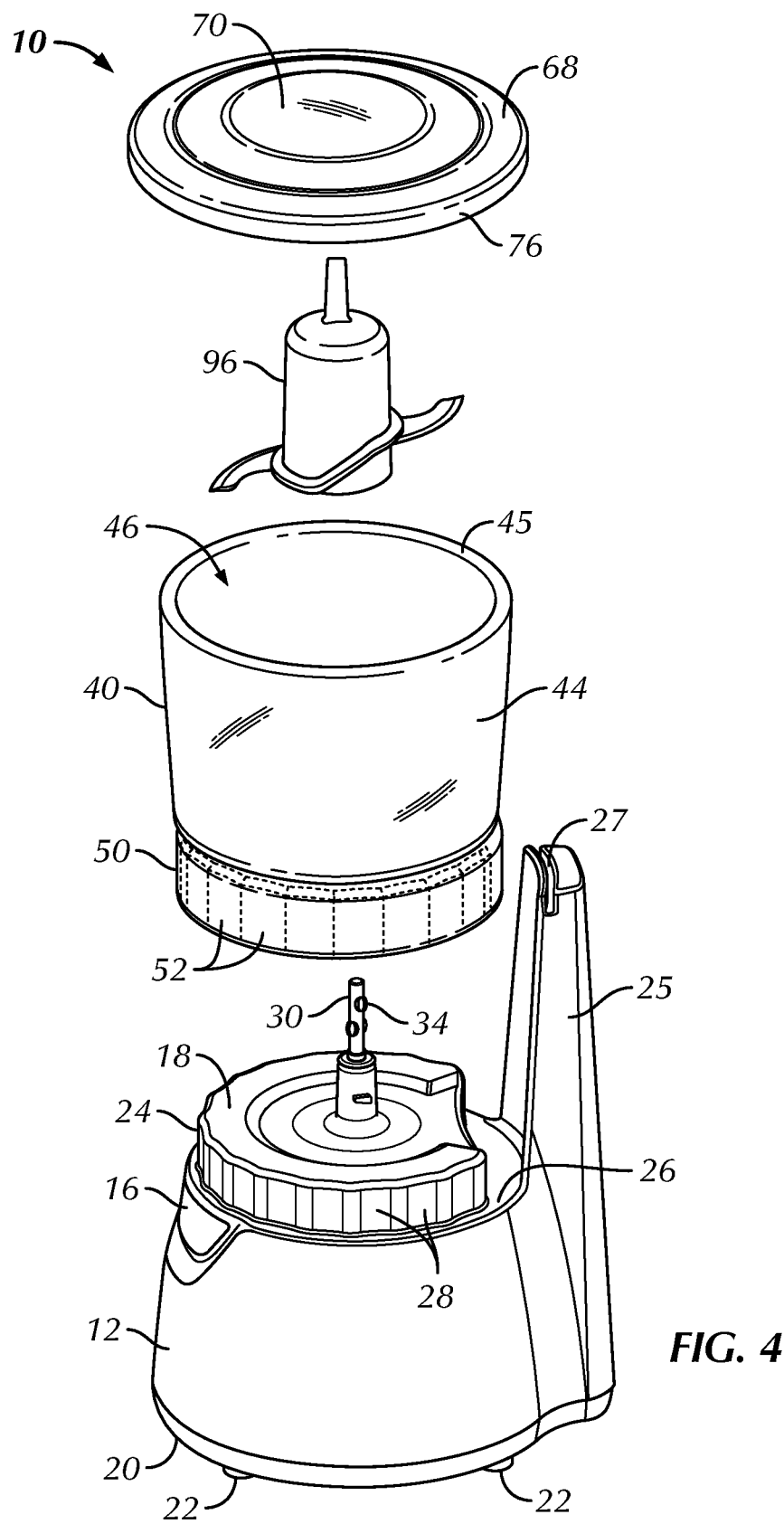
FIG. 4 is a partially exploded perspective view of the kitchen appliance of FIG. 1, wherein at least a portion of a skirt of a bowl of the kitchen appliance is shown as being at least partially transparent for clarity of the disclosure.

As shown in FIGS. 2-4, the housing 12 includes a first upper end 18 and an opposing second lower end 20. Two or more spaced-apart feet 22 may extend downwardly from the second lower end 20 of the housing 12 to support the kitchen appliance 10 on the support surface. However, the kitchen appliance 10 is not limited to inclusion of the feet 22. For example, a bottom surface of the second lower end 20 of the housing 12 may rest directly on the support surface. As shown in FIGS. 1-4, the housing 12 may include an extension 25 that extends outwardly (longitudinally and/or radially) beyond a remainder of the housing 12. Thus, at least a portion of the extension 25 may extend upwardly beyond the first upper end 18 of the housing 12. The extension 25 includes a slot 27 proximate an upper end of the extension 25. The slot 27 may have a generally curved or arcuate shape.

Referring to FIGS. 1 and 4, the housing 12 may have a generally cylindrical shape with a reduced diameter portion 24 (see FIG. 4) proximate the first upper end 18 thereof. A ledge 26 (see FIG. 4) preferably delineates the reduced diameter portion 24 from the remainder of the housing 12. The ledge 26 preferably extends generally, if not exactly, perpendicularly to the longitudinal axis A of the kitchen appliance 10. The reduced diameter portion 24 of the housing 12 preferably has a generally constant or consistent diameter throughout a height thereof, such that an exterior surface of the reduced diameter portion 24 extends generally, if not exactly, parallel to the longitudinal axis A of the kitchen appliance 10.

Referring to FIG. 4, at least one and preferably a plurality of spaced-apart grooves 28 may extend at least partially radially inwardly into the reduced diameter portion 24 of the housing 12. Each groove 28 preferably has a generally arcuate, concave shape and preferably extends the entire height of the reduced diameter portion 24. In other words, each groove 28 preferably extends from the ledge 26 to the first upper end 18 of the housing 12. Each groove 28 preferably extends generally, if not exactly, parallel to the longitudinal axis A of the kitchen appliance 10.

As shown in FIGS. 2-4, a drive shaft 30 extends upwardly from the first upper end 18 of the housing 12. The drive shaft 30 is operatively connected to and driven by the motor 12 through a gear reduction system 32 (see FIGS. 2 and 3), as understood by those of skill in the art. Therefore, the drive shaft 30 is rotatable with respect to the housing 12. The drive shaft 30 may include one ore more projections 34 that extend at least slightly radially outwardly therefrom. The housing 12 may include a control panel 16 with one or more buttons or switches 17 (see FIG. 1), which allows a user to control operation of the motor 14.

The housing 12 may be constructed of a polymeric material, such as an injection molded acrylonitrile butadiene styrene (ABS) material. The ABS material may be desirable due to its relatively smooth surface finish, its ability to readily take on various colors, its high impact and crack resistance, and its ability to be plated with a metallic finish. However, the housing 12 is not limited to polymeric or injected molded ABS materials, and may be constructed of nearly any generally rigid material that is able to take on the general shape of the housing 12 and perform the functionality of the housing 12 described herein. For example, the housing 12, and any other components of the kitchen appliance 10, may be constructed of a metallic or like material or combination of materials. The housing 12 may be generally or completely opaque, translucent or transparent.

Referring to FIGS. 1-4, a bowl or jar 40 is removably mountable to at least a portion of the first upper end 18 of the housing 12. The bowl 40 includes a base wall 42 and a side wall 44 extending upwardly therefrom. The base wall 42 extends generally, if not exactly, perpendicularly to the longitudinal axis A. As shown in FIGS. 3 and 4, the side wall 44 has an upper rim 45 that defines a mouth 46 opposite the base wall 42 for receiving a rotatable tool 96 within the bowl 40. The bowl 40 may include a handle (not shown) that extends radially outwardly from at least a portion of an exterior surface of the side wall 44 of the bowl 40.

Referring again to FIGS. 1-4, the bowl 40 preferably includes a skirt 50 extending downwardly from the base wall 42 opposite the mouth 46. The skirt 50 preferably extends generally, if not exactly, perpendicularly to the longitudinal axis A. The skirt 50 preferably extends around an entire periphery of the bowl 40 and is preferably arcuate in shape to match a general circular or cylindrical shape of the bowl 40 when viewed from above or below. When the bowl 40 is properly mounted on to the housing 12, a free end of the skirt 50 preferably contacts or engages at least a portion of the ledge 26 of the housing 12.

As shown in FIG. 4, at least one and preferably a plurality of spaced-apart projections 52 may extend radially inwardly from an interior surface of the skirt 50. The projections 52 may extend around an entire periphery of the interior surface of the skirt 50. Each projection 52 preferably has an arcuate, convex shape that preferably extends an entire height of the skirt 50 (i.e., from the base wall 42 of the bowl 40 to the free end of the skirt 50), so as to be complementary to one of the grooves 28 of the housing 12 when the bowl 40 is properly mounted onto the housing 12. Each projection 52 preferably extends generally, if not exactly, perpendicularly to the longitudinal axis A. The location of the projections 52 of the skirt 50 and the grooves 28 of the housing 12 may be reversed, such that the projections 52 are formed on the housing 12 and the grooves 28 are formed on the skirt 50.

As is evident from FIGS. 2 and 4, the bowl 40 is removably mountable to the housing 12 by positioning at least a portion of the skirt 50 of the bowl 40 to surround at least a portion of the reduced diameter portion 24 of the housing 12. More preferably, when the bowl 40 is properly attached or mounted to the housing 12, the skirt 50 surrounds the entire reduced diameter portion 24. A diameter of the interior surface of the skirt 50 is preferably at least slightly greater than a diameter of the exterior surface of the reduced diameter portion 24. As a result, the skirt 50 can surround the reduced diameter portion 24 in a relatively close manner, such that the bowl 40 is stable when properly positioned on the housing 12.

In particular, when the bowl 40 is properly positioned on the housing 12, each projection 52 of the skirt 50 is preferably at least partially received within one of the grooves 28 of the housing 12. As a result, the bowl 40 is preferably properly attached to the housing 12 by moving the bowl 40 in a vertical manner generally, if not exactly, parallel to the longitudinal axis A of the kitchen appliance 10. In other words, it is preferred that the bowl 40 is properly attached to the housing 12 by moving the bowl 40 linearly downwardly on to the housing 12, such that no twisting of the bowl 40 relative to the housing 12 is required once the bowl 40 contacts the housing 12. Such a method of assembling the kitchen appliance 10 is generally simpler and easier than prior art methods.

As shown in FIGS. 2 and 3, a column 54 preferably extends upwardly from the base wall 42 and into a cavity of the bowl 40. The column 54 is preferably permanently and/or integrally attached to the bowl 40. The column 54 generally extends along the longitudinal axis A from the base wall 42 of the bowl 40 to at least slightly above an approximate midpoint between the upper rim 45 and the base wall 42. When the bowl 40 is properly mounted onto the first free end 18 of the housing 12, the column 54 preferably surrounds at least a portion of the drive shaft 30 of the housing 12. However, at least an upper portion of the drive shaft 30 preferably extends upwardly beyond a top end of the column 54 when the bowl 40 is properly mounted onto the first free end 18 of the housing 12. As shown in FIGS. 2 and 3, a gap or spacing separates the column 54 from the drive shaft 30 so as to receive at least a portion of the rotatable tool 96.

The bowl 40 may be constructed of a relatively rigid polymeric material, such as a molded styrene acrylonitrile (SAN) material. However, the bowl 40 is are not limited to constructions using molded SAN material and may be constructed of nearly any polymeric, metallic, glass or like material that is able to form the desired shape(s) and withstand the normal operating conditions described herein. The bowl 40 any other features or complementary components may be may be generally or completely opaque, translucent or transparent.

Referring to FIGS. 2-4, the kitchen appliance 10 preferably includes the at least one rotatable tool 96, and possible two or more separate and distinct rotatable tools or cutting mechanisms (none shown). The rotatable tool 96 is sized and shaped so as to be positioned entirely within the space surrounded by the bowl lid 68 and the bowl 40 when the bowl lid 68 is properly mounted to the bowl 40. The rotatable tool 96 is preferably sized and/or shaped to fit over the column 54 in the bowl 40 and engage at least a portion of the drive shaft 30 of the housing 12, such that rotation of the drive shaft 30 effectuates rotation of the rotatable tool 96 within the bowl 40. An inner portion of the rotatable tool 96 may include one or more slots (not shown) that complementarily engage one or more of the projections 34 of the drive shaft 30. The rotatable tool 96 may be a slicing or S-blade. However, the rotatable tool 96 may have an alternative form or shape, such as a generally flat or planar shredding blade. It is preferred that two rotatable tools are not simultaneously operated or rotated within the bowl 40. However, if desired, the two rotatable tools may be placed on or attached to the column 54 and/or the drive shaft 30 at least for storage purposes.

Referring to FIGS. 1-5, a bowl lid 68 is removably mountable onto the upper rim 45 of the bowl 40 to thereby close the mouth 46. The bowl lid 68 preferably includes a top wall 70 and a plurality of spaced-apart flanges depending downwardly therefrom. The top wall 70 may have at least a slightly arcuate cross-sectional shape when viewed from the side (see FIGS. 2 and 3). The plurality of flanges may include a first flange 72, a second flange 74 and a third flange 76. Each of the plurality of flanges 72, 74, 76 may depend downwardly from the top wall 70 at an angle that is at least generally parallel with the longitudinal axis A. At least a portion of one of the plurality of flanges 72, 74, 76 is at least partially arcuate to complement that size, shape and/or configuration of the slot 27 of the extension 25 of the housing 12.

Figure 5:
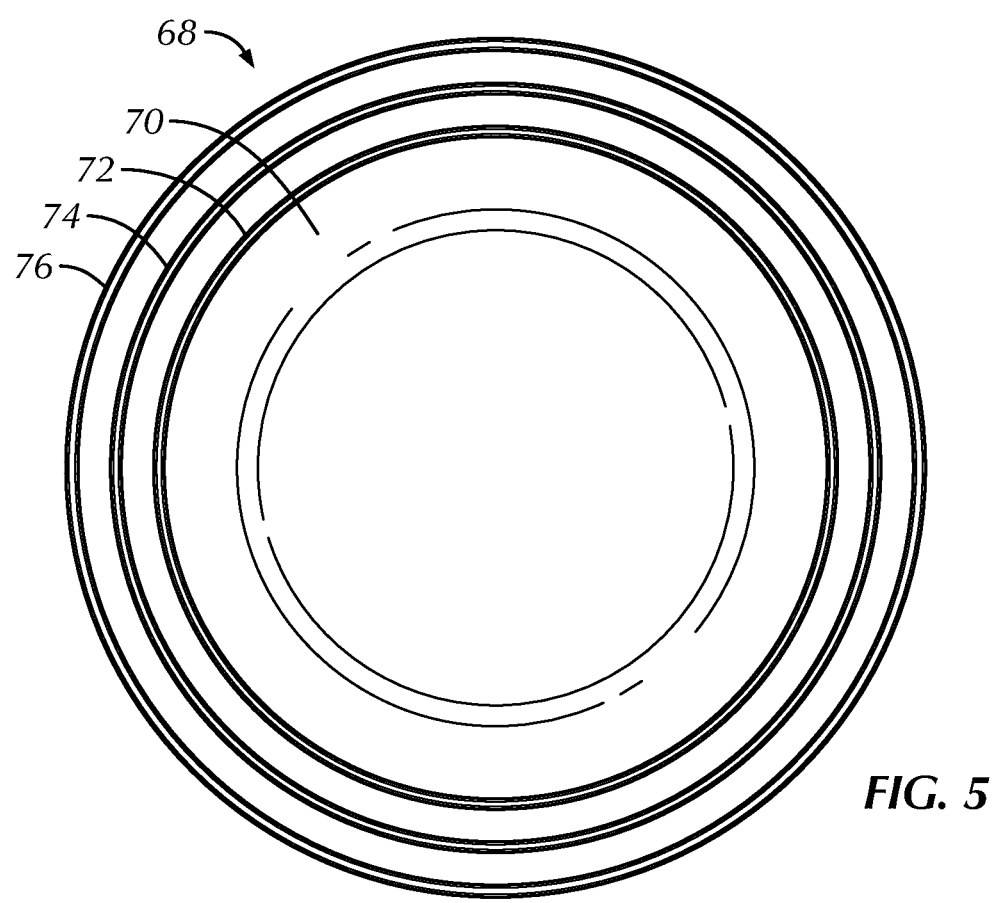
FIG. 5 is a bottom plan view of a lid of the bowl of the kitchen appliance of FIG. 1.

As shown in FIGS. 2, 3 and 5, the first flange 72 is preferably spaced radially inwardly from the second flange 74, and the second flange 74 is preferably spaced radially inwardly from the third flange 76. More specifically, as shown in FIG. 5, it is preferred that the plurality of flanges 72, 74, 76 form concentric circles when viewing the bowl lid 68 from below. As shown in FIG. 3, the first flange 72 extends downwardly from the top wall 70 further than both the second flange 74 and the third flange 76. At least a portion of the first flange 72 may sealingly engage at least a portion of an interior surface of the side wall 44 of the bowl 40 when the bowl lid 68 is properly attached to the bowl 40. The third flange 76 extends downwardly from the top wall 70 further than the second flange 74. As described in detail below, at least a portion of one of the plurality of flanges 72, 74, 76 is preferably sized, shaped and or configured to complement and fit within at least a portion of the slot 27 of the extension 25 of the housing 12.

When viewed from above and/or below, the bowl lid 68 preferably has a generally circular shape to match the generally circular shape of the bowl 40. As shown in FIG. 2, at least a portion of the upper rim 45 of the bowl 40 is generally sealingly positioned between the first and second flanges 72, 74 when the bowl lid 68 is properly positioned onto the bowl 40. In contrast to conventional bowl lids, the bowl lid 68 may be attached to the bowl 40 without twisting the bowl lid 68 relative to the bowl 40 once the bowl lid 68 contacts the bowl 40. Instead, the bowl lid 68 is preferably vertically movable with respect to the bowl 40 along the longitudinal axis A to attach and/or remove the bowl lid 68 from the bowl 40. Such a method of assembling the kitchen appliance 10 is generally simpler and easier than prior art methods.

Referring to FIGS. 2 and 3, a generally elongated actuation member 38 is preferably at least partially surrounded by the housing 12. The actuation member 38 may be substantially or completely enclosed by the extension 25 of the housing 12. The actuation member 38 is movable with respect to the extension 25 and/or the housing 12 between a first position (FIG. 3) and a second position (FIG. 2). The first and second positions are preferably spaced-apart along the longitudinal axis A. In the first position (FIG. 3), at least a portion of the actuation member 38 is preferably spaced-apart from the switch mechanism 36 to maintain the switch mechanism 36 in the first, open or disengaged position and prevent actuation of the motor 14. In the second position (FIG. 4), at least a portion of the actuation member 38 preferably contacts or engages the switch mechanism 36 to actuate or permit actuation of the motor 14. A biasing member 39, such as a coil spring, preferably biases the actuation member 38 vertically upwardly to the first position. The biasing member 38 preferably surrounds at least a portion of the actuation member 38.

Preferably, the actuation member 38 is a safety interlock feature of the kitchen application 10, such that the motor 14 cannot be actuated unless certain components are properly assembled and/or configured. For example, it is preferred that if the bowl 40 is not properly attached to the housing 12, and the bowl lid 68 is not properly attached to the bowl 40, the motor 14 cannot be actuated. When the kitchen appliance 10 is in the fully assembled configuration (see FIG. 1), such that the bowl lid 68, the bowl 40 and the housing 12 are properly assembled, and when power is supplied to the motor 14, it is preferred that the motor 14 can be actuated by either pressing downwardly on the bowl lid 68 (e.g., one hand operation) and/or by engaging the control panel 16 of the housing 12 when the bowl lid 68 is pressed downwardly on the bowl 40 (e.g., one or two hand operation, such as one hand on the control panel 16 and the other hand simultaneously on the bowl lid 68).

For example, when the bowl lid 68 is properly mounted onto the upper rim 45 of the bowl 40, the motor 14 may be actuated or permitted to be actuated by pressing downwardly on the bowl lid 68, such that at least a portion of one of the plurality of flanges 72, 74, 76 contacts at least a portion of the actuation member 38 to force the actuation member 38 to the second position (see FIG. 2). In particular, it is preferred that at least a portion of the third flange 76 enters or is received into at least a portion of the slot 27 of the extension 25 and contacts an upper end of the actuation member 38. As the bowl lid 68 is pushed further downwardly, the force of the third flange 76 on the actuation member 38 overcomes the upwardly biasing force of the biasing member 39, such that the actuation member 38 moves at least slightly downwardly and into engagement with at least a portion of the switch mechanism 36. Such a configuration is advantageous because there is little or no horizontally-extending force (e.g., parallel to the longitudinal axis A) generated by the safety interlock feature that tends to separate the housing and bowl of conventional kitchen appliances.

In one embodiment, when power is supplied to the motor 14, the motor 14 may be actuated as soon as one of the plurality of flanges 72, 74, 76 moves the actuation member 38 into engagement with the switch mechanism 36. In other words, pressing downwardly on the bowl lid 68 may be sufficient to actuate the motor 14 when the kitchen appliance 10 is properly assembled and power is supplied to the motor 14. In such an embodiment, a user may be required to maintain a downward force of relatively constant magnitude on the bowl lid 68 to continue operation of the motor 14. For example, if the user were to remove the downward force on the bowl lid 68, the motor 14 may cease operation as a result of the biasing member 39 moving the actuation member 38 out of engagement with the switch mechanism 36.

In an alternative embodiment, once the actuation member 38 and the switch mechanism 36 are in engagement, the motor 14 may only be permitted to be actuated. In other words, simply pushing downwardly on the bowl lid 68 may not actuate the motor 14. To effectuate actuation of the motor 14 in the above configuration, the user may be required to depress or move the button 17 on the control panel 16 during (i.e., simultaneously) or after (i.e., subsequently) the bowl lid 68 has been pressed downwardly.

A preferred method of assembling the kitchen appliance 10 to process foodstuff therein includes placing the housing 12 on the support surface. The bowl 40 is preferably attached or mounted onto the first upper end 18 of the housing 12 by moving the bowl 40 vertically downward from above (i.e., along the longitudinal axis A). The above-described movement of the bowl 40 with respect to the housing 12 allows each projection 52 of the bowl 40 to engage one of the grooves 28 of the housing 12 and allows at least a portion of the drive shaft 30 to be placed within the column 54 of the bowl 40. The rotatable tool 96 is preferably inserted into and/or attached to the bowl 40, either before or after the bowl 40 is mounted onto the housing 12. Foodstuff to be processed, blending and/or mixed may be placed in the bowl 40, and power may be supplied to the motor 14, before or after the bowl 40 is mounted on to the housing 12. The bowl lid 68 is preferably attached onto the upper rim 45 of the bowl 40 by moving the bowl lid 68 vertically downward from above (i.e., along the longitudinal axis). The bowl lid 68 may "snap fit" onto the bowl 40 by inserting at least a portion of the upper rim 45 into a spaced between the first and second flanges 72, 74 of the bowl lid 68. The above-described steps allow the safety interlock feature to be activated or engaged, thereby allowing a user to control operation of the motor 14 through one or both of the relatively simple steps of pressing downwardly on the bowl lid 68 and engaging the button 17 on the control panel 16. The above-described method of assembling and processing is not limited to the precise order of operations described, and one or more of the steps may occur before or after another.

A preferred method of operating the kitchen appliance 10 to process foodstuff therein includes mounting the bowl lid 68 onto the upper rim 45 of the bowl 40 such that at least a portion of the third flange 76 is received within the slot 27 of the housing 12. A downwardly force is applied onto at least a portion of the bowl lid 68 such that at least a portion of the flange 76 depending downwardly from the top wall 70 of the bowl lid 68 contacts at least a portion of the actuation member 38 to engage the switch mechanism 36. At this point, actuation of the motor 14 may begin immediately, or actuation may commence one the control panel 16 is engaged. To deactivate the motor 14, the bowl lid 68 may be removed from the upper rim 45 of the bowl 40 to allow the actuation member 38 to move at least slightly upwardly and out of engagement with the switch mechanism to deactivate the motor 14. Alternatively, to deactivate the motor 14, the control panel 16 may be engaged.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A kitchen appliance for processing foodstuff comprising:
   a housing enclosing a motor and a switch mechanism to actuate or permit actuation of the motor, the housing including an extension extending upwardly beyond an upper end of the housing;
   a bowl removably mountable onto the housing, the bowl including an upper rim defining a mouth for receiving a rotatable tool within the bowl;
   at least one actuation member positioned at least partially within the extension of the housing and movable between a first position and a second position, in the first position the actuation member being spaced-apart from the switch mechanism to maintain the switch mechanism in an open position and prevent actuation of the motor, in the second position the actuation member engaging the switch mechanism to actuate or permit actuation of the motor; and a bowl lid removably mountable onto the upper rim of the bowl, the bowl lid including a top wall, a first flange depending downwardly from the top wall, a second flange depending downwardly from the top wall, and a third flange depending downwardly from the top wall, the third flange surrounding the second flange, the second flange surrounding the first flange, wherein, when the bowl lid is properly positioned onto the upper rim of the bowl, at least a portion of the third flange contacts at least a portion of the actuation member to force the actuation member to the second position.

2. The kitchen appliance according to claim 1, wherein, when the bowl is properly positioned onto the upper rim of the bowl, the motor is actuated by pressing downwardly on the lid such that at least a portion of the third flange contacts at least a portion of the actuation member to force the actuation member to the second position.

3. The kitchen appliance according to claim 1, wherein the extension of the housing includes a slot proximate an upper end thereof, the slot receiving at least a portion of the third flange when the bowl lid is properly mounted onto the upper rim of the bowl.

4. The kitchen appliance according to claim 1, further comprising:

a control button on a portion of the housing, wherein the motor is actuated by engaging the control button when the third flange contacts the actuation member to force the actuation member to the second position.

\* \* \* \* \*